US008233169B2

(12) United States Patent
Teshima

(10) Patent No.: US 8,233,169 B2
(45) Date of Patent: Jul. 31, 2012

(54) IMAGE FORMING APPARATUS

(75) Inventor: Katsunori Teshima, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 746 days.

(21) Appl. No.: 12/104,876

(22) Filed: Apr. 17, 2008

(65) Prior Publication Data

US 2008/0304094 A1 Dec. 11, 2008

(30) Foreign Application Priority Data

Jun. 7, 2007 (JP) ................................ 2007-151893

(51) Int. Cl.
*G06K 15/00* (2006.01)
*G06F 3/12* (2006.01)

(52) U.S. Cl. ...................................... 358/1.14; 358/1.15

(58) Field of Classification Search ................. 358/1.14, 358/1.15, 1.9
See application file for complete search history.

(56) References Cited

U.S. PATENT DOCUMENTS 7,110,692 B2 * 9/2006 Kotani ............................ 399/81
2003/0088642 A1 * 5/2003 Price et al. .................... 709/218

FOREIGN PATENT DOCUMENTS

JP 08-305520 11/1996
JP 09-097146 4/1997
JP 2005-111733 4/2005

OTHER PUBLICATIONS

Notification of Reasons for Refusal issued on Aug. 30, 2011, in corresponding Japanese Patent Application No. 2007-151893.

* cited by examiner

*Primary Examiner* — James A Thompson
(74) *Attorney, Agent, or Firm* — Finnegan, Henderson, Farabow, Garrett & Dunner, L.L.P.

(57) ABSTRACT

A control unit to set a priority level to operate the audio replay function so that the priority level is higher in an abnormal operation of the apparatus than in a normal operation of the apparatus is provided in the image forming apparatus 10 which comprises a plurality of functions including an image forming function and an audio replay function. For example, the priority level of the audio replay function to a lowest level in the normal operation, and sets to a highest level next to a priority level of the image forming function in the abnormal operation.

15 Claims, 6 Drawing Sheets

FIG. 5

40

| DEVICE | A | B | C | ... |
|---|---|---|---|---|
| OPERATION PERIOD | 100 μs | 200 μs | 80 μs | ... |
| OPERATION COUNTER | 1 | 2 | 0 | ... |

IMAGE FORMING APPARATUS

BACKGROUND OF THE INVENTION

1. Field of the Invention

The present invention relates to an image forming apparatus, particularly to an image forming apparatus which provides an audio guidance function to carry out a guidance regarding various types of information such as an operation condition and an abnormal condition of the apparatus by audio.

2. Description of Related Art

In recent years, there is an increasing need to implement an audio guidance function to carry out a guidance regarding an operation condition and an abnormal condition of the apparatus by audio in the image forming apparatus such as a printer, a copier and the like.

As a technique to implement the audio guidance function in the image forming apparatus, a structure in which the audio data memory which stores the audio data and the audio output unit are connected to the bus and in which the audio output unit replays and outputs the guidance audio by using the audio data (digital audio signal) which is transmitted from the audio data memory through the bus is disclosed (see JP2005-111733A).

Moreover, a number of devices such as the HDD (Hard Disk Drive) controller, the USB (Universal Serial Bus) controller, the LCD (Liquid Crystal Display) controller and the like are connected to the bus of the image forming apparatus, and the device operates to carry out the transmission of the image data (digital image signal) through the bus when the image is read or when the image is written and various types of data, control signals and the like are transmitted through the bus when the HDD controller, the LCD controller and the like are operating. Further, each device and each function which share the bus are structured so as to operate according to the priority level which is decided in advance.

In the image forming apparatus, the level of importance of the audio guidance function is different between in the normal operation of the apparatus and in the abnormal operation of the apparatus. For example, the degree of urgency of the audio guidance function is not so high in the normal operation because the main usage of the function is to explain the operation condition, the operating method and the like and the level of importance of the audio guidance function can be low comparing to the other functions. However, in an emergency situation where an abnormality such as a breakdown, an error or the like have occurred in the apparatus, the level of importance of the audio guidance function becomes high because there is a need to promptly make an announcement regarding the abnormality to a user.

In the structure in which the guidance is carried out by transmitting the audio data though the bus and replaying the audio as in JP2005-111733A, there is a possibility that the operation of the other functions are blocked by the audio guidance function in the normal operation when the priority level of the audio guidance function is fixedly set so as to be at the higher level than the other functions by emphasizing the announcement in the abnormal operation. For example, when the priority level of the audio guidance function is set to be at a higher level than the HDD controller, the LCD controller and the like, the bus is occupied due to the transmission of the audio data at the time of audio replay and the operations such as the access to the HDD, the display by the LCD and the like are influenced by this. Therefore, there is a risk that the performance of the apparatus is reduced in the normal operation.

On the other hand, when the priority level of the audio guidance function is fixedly set so as to be lower than the other functions in order to prevent the above mentioned inconvenience, there is a possibility that the announcement cannot be made promptly in the abnormal operation because the audio replay by the transmission of the audio data through the bus is blocked while the bus is occupied by the other functions being operated. For example, when an abnormality occurs during the operation of the tasks relating to the printing operation or when the bus is in the busy condition (such case when the device which is connected to the bus is operated and when a large amount of data is being transmitted via the bus), there is a possibility that the guidance audio is interrupted because the supply of the audio data cannot make it in time for the replay timing of the audio and there is a risk that the content of abnormality cannot be announced correctly and promptly because the audio data stored in the audio data memory on the bus cannot be transmitted to the audio output unit for every sampling cycle during this period of time.

Moreover, when the priority level of the audio guidance function in the abnormal operation is set to be at a higher level than the image forming function, the operation of the image forming function is blocked by the audio guidance function. For example, when an operation error such as paper jam of the document occurs in the reading side in a state where the printing of a plurality of copies of the previously read document and the reading of the next document are carried out at the same time, the audio replay to announce the abnormality is preferentially executed and the printing operation is influenced by this. Therefore, the productivity of the image forming may be reduced in the abnormal operation.

SUMMARY OF THE INVENTION

In view of the above problem, an object of the present invention is to provide an image forming apparatus which prevents the performance reduction of the apparatus due to the audio replay in the normal operation and which can carry out the announcement of the abnormality by the audio replay in the abnormal operation more preferentially than in the normal operation.

In order to achieve the above object, according to an aspect of the preferred embodiment of the present invention, there is provided an image forming apparatus comprising a plurality of functions including an image forming function and an audio replay function and a control unit to set a priority level to operate the audio replay function so that the priority level is higher in an abnormal operation of the apparatus than in a normal operation of the apparatus.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 5 is a diagram showing a table used to obtain an operation period of a device which is connected to a bus of the image forming apparatus according to the embodiment of the present invention.

DESCRIPTION OF THE PREFERRED EMBODIMENTS

Hereinafter, the embodiment of the present invention will be described based on the drawings.

Figure 1:
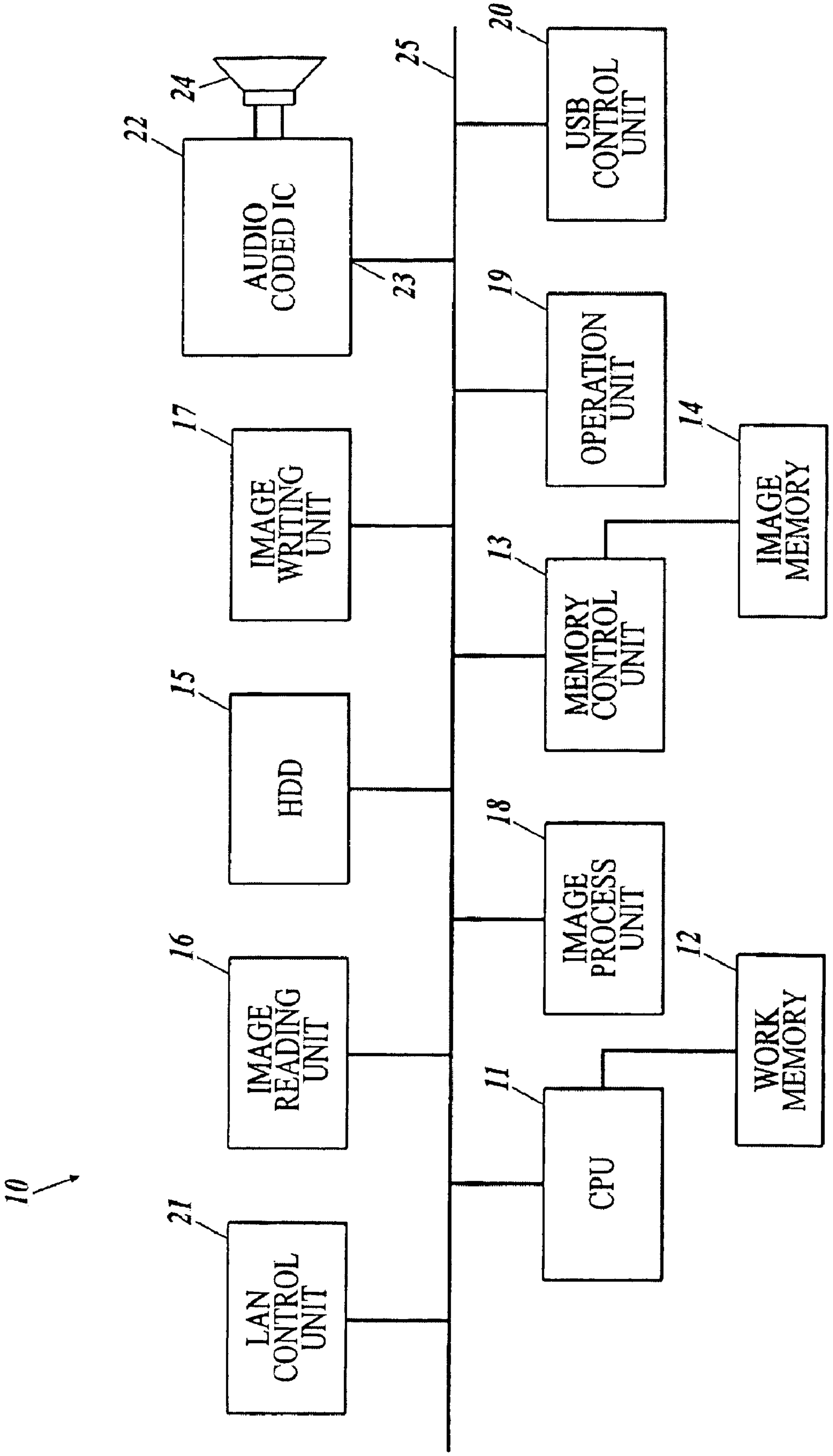
FIG. 1 is a block diagram showing a structure of the image forming apparatus according to the embodiment of the present invention.

FIG. 1 shows a block diagram of a structure of the image forming apparatus 10 according to the embodiment of the present invention. The image forming apparatus 10 is structured as a copier in which a copy function that reads the document, forms the corresponding image on the paper and outputs the paper, a scanner function and a printer function and the like. Further, the image forming apparatus 10 comprises an audio guidance function to carry out a guidance relating to various types of information such as the operation condition, the abnormal condition, the operation method and the like of the apparatus by an audio.

In order to realize the above mentioned each function, the image forming apparatus 10 comprises the CPU (Central Processing Unit) 11, a work memory 12 connected to the CPU 11, a memory control unit 13, an image memory 14 connected to the memory control unit 13, the HDD 15, an image reading unit 16, an image writing unit 17, an image process unit 18, an operation unit 19, the USB control unit 20, the LAN (Local Area Network) control unit 21, an audio codec IC 22 and a speaker 24 connected to the audio codec IC 22. Further, the CPU 11, the memory control unit 13, the HDD 15, the image reading unit 16, the image writing unit 17, the image process unit 18, the operation unit 19, the USB control unit 20, the LAN control unit 21 and the audio codec IC 22 are connected to one another via the bus 25 which is for transmitting (transferring) the signal (data).

The CPU 11 comprises an arithmetic processing function and also functions as a control unit to integrally control the operation of the entire image forming apparatus. The work memory 12 carries out the function to temporarily store the program to be executed by the CPU 11 and various types of data when the program is executed. Further, the audio data which corresponds to various types of guidance audio used in the audio guidance function is stored in the work memory 12.

The memory control unit 13 carries out the function to control the writing and reading of an image data to and from the image memory 14. The image memory 14 carries out the function to temporarily store the image data which is written by the memory control unit 13. The HDD 15 is used to store the control program, the program of general-purpose operating system, various types of parameters specific to the apparatus and the like. By executing the activation program in the CPU 11 at the time of activation of the image forming apparatus 10, the program in the HDD 15 is expanded in the work memory 12 and is operated.

The image reading unit 16 carries out the function to read the document image and to incorporate the corresponding image data. The image writing unit 17 carries out the function to form and to output the image which corresponds to the image data on a paper by the electrophotographic process. The image process unit 18 carries out the function to carry out various types of image processes to the image data.

Moreover, for example, the image reading unit 16 comprises an automatic document feeder to continuously read a plurality of sheets of document in order, a light source to irradiate the document, the CCD (Charge Couple Device) type line image sensor to read one line worth of the document in the width direction, a moving mechanism to move the reading position of a line unit in the length direction of the document, an optical component constituted of a lens or a mirror which forms an image by leading the light reflected from the document to the line image sensor, an A/D converter to convert the analog image signal which is output by the line image sensor into the digital image data, the control unit to control the operation of the image reading unit 16 and the like (all of them are omitted from the drawing). For example, the image writing unit 17 is structured as a so-called laser printer which comprises a paper carrier device, a photoconductor drum, a charging device, a laser unit using the LD (Laser Diode) as the light source, a developer, a transfer-separation device, a cleaning device, a fixing device, a control unit to control all the above and the like (all of them are omitted from the drawing).

Each control unit of the image reading unit 16 and the image writing unit 17 is structured by having the CPU, the ROM (Read Only Memory), the RAM (Random Access Memory) as the main unit. Each control unit carries out the communication of the operation command and the status between the CPU 11, and controls the reading of the document and the image forming operation based on the instruction from the CPU 11.

The operation unit 19 is constituted of a liquid crystal display comprising a touch panel on the surface and various types of operation switches. The operation unit 19 has a function of carrying out various types of guiding displays and condition displays to a user and a function of receiving various types of operations from a user. Further, the guidance audio which is output when an abnormality of the apparatus occurs is preset so as to be output for a certain period of time, and the setting of the certain period of time can be changed through the operation unit 19. When the resetting operation and the recovery from an abnormality are carried out through the operation unit 19 and when a predetermined finishing event occurs while the guidance audio is outputted, the announcing operation stops even before the certain period of time has passed.

The USB control unit 20 carries out the function to control the transmission of the data between the external equipment or the external device which is connected to the USB terminal (omitted from the drawing) of the image forming apparatus 10 and the device inside the apparatus. The LAN control unit 21 carries out the function to control the communication and the transmission of data carried out between the external device connected to the LAN terminal (omitted from the drawing) of the image forming apparatus 10 via the network.

The audio codec IC 22 comprises the digital I/F 23 for the digital signal, and the bus 25 is connected to the digital I/F 23. The audio codec IC 22 has a function to carry out the DA (Digital-Analog) conversion to the digital audio signal (audio data) which is input from the digital I/F 23 and output the signal as the analog audio signal. The speaker 24 carries out the function to output the guidance audio corresponding to the analog audio signal which is input from the audio codec IC 22.

Figure 2A:
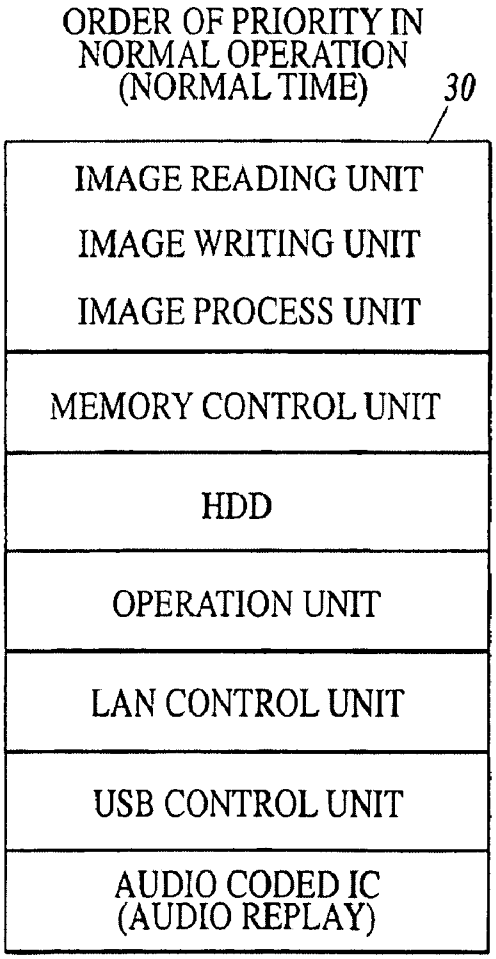
FIG. 2A is a diagram showing a table in which priority levels of operations of the devices which are provided in the image forming apparatus according to the embodiment of the present invention are registered.
Figure 2B:
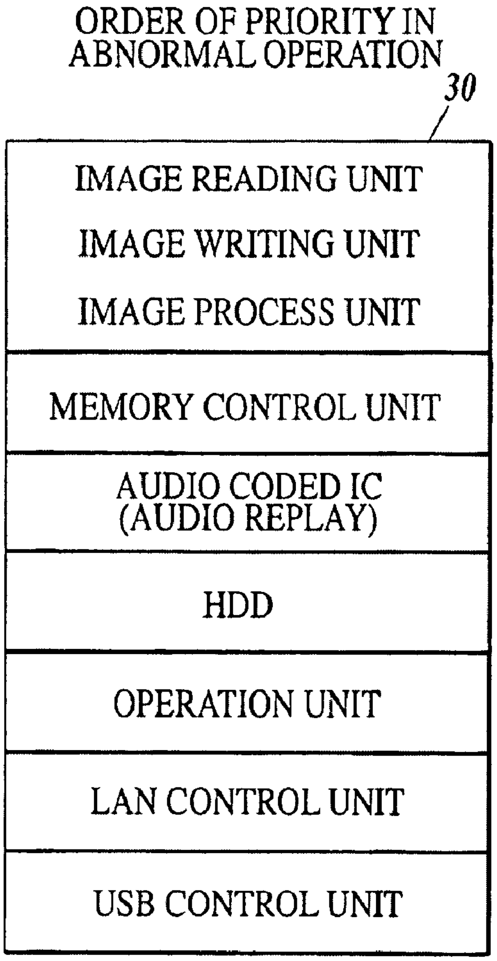
FIG. 2B is a diagram showing a table in which priority levels of operations of the devices which are provided in the image forming apparatus according to the embodiment of the present invention are registered.

FIGS. 2A and 2B shows an example of the table 30 in which the priority level of the operation of each device provided in the image forming apparatus 10 is registered, the priority level being decided in the CPU 11. As types of the devices provided in the image forming apparatus 10, the "image reading unit/image writing unit/image process unit", the "memory control unit", the "HDD", the "operation unit", the "LAN control unit", the "USB control unit" and the "audio codec IC (audio replay)" which are mentioned above are registered in the table 30. The table 30 is set by the CPU 11 when the image forming apparatus 10 is activated, and the priority level of the operation of the audio replay (audio codec IC) is to be changed in the normal operation and the abnormal operation of the image forming apparatus 10.

Particularly, when the image forming apparatus 10 is in the normal operation (normal time), each device is registered in the table 30 in the above order as shown in FIG. 2A. For example, the "image reading unit/image writing unit/image process unit" relating to the printing operation is registered at the highest level, the "memory control unit" relating to the access of the image data is registered at the second highest level (the second), and the "audio codec IC" relating to the audio replay is registered at the lowest level.

Moreover, when the image forming apparatus 10 is in the abnormal operation, the priority level of the "audio codec IC" is raised and is registered at the level (the third) next to the "image reading unit/image writing unit/image process unit" and the "memory control unit", and is set so that the priority level is at the higher level than the "HDD", the "operation unit", the "LAN control unit" and the "USB control unit" as shown in FIG. 2B. By switching the priority level, the operation of the audio replay in the abnormal operation is set so as to be at the level next to the tasks needed for the printing operation such as the reading operation of the image, the writing operation of the image, the image process operation to process the image and the like. Further, when the image forming apparatus 10 is restored from the abnormality and is recovered to the normal condition, the priority level of each device which is registered in the table 30 returns to the priority level of the normal operation (condition shown in FIG. 2A).

The CPU 11 controls the operation of each device by transmitting a command when the image forming apparatus 10 is operating (command control). The CPU 11 also changes the table 30 as mentioned above between in the normal operation and in the abnormal operation of the apparatus and functions so as to operate each device according to the priority level registered in the table 30 in the normal operation or in the abnormal operation. Further, each device has a function to carry out a predetermined operation based on the command received from the CPU 11.

Subsequently, an operation of the image forming apparatus will be described.

Figure 3:
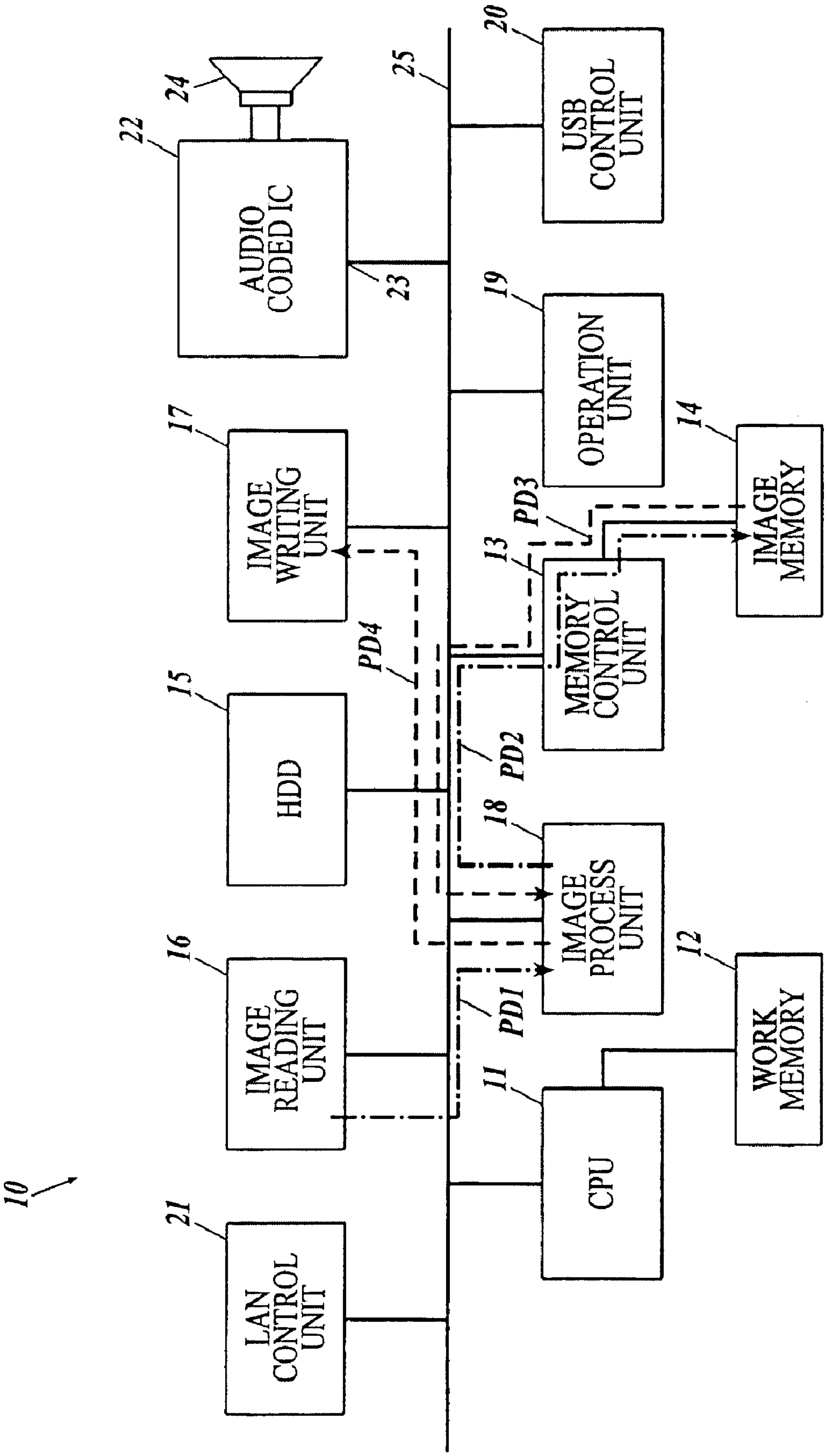
FIG. 3 is a data flow diagram of an image data when the document image is output to the reading paper in the image forming apparatus according to the embodiment of the present invention.

FIG. 3 shows the flow of the image data PD when the document image is output (printed) to the reading paper in the image forming apparatus 10.

In the document reading operation by the image reading unit 16, the document which is set in the automatic document feeder is sent to the reading position and is irradiated by the illuminating light from the light source. An image is formed using the reflection light from the document by being lead to the line image sensor by the optical component constituted of a lens or a mirror, and the line image sensor continuously reads the document one line by one line in the width direction as the document is moved in the length direction of the document by the moving mechanism. The analog image signal of the document which is read by the line image sensor and which is photoelectrically converted and outputted is converted into a digital image data by the A/D converter and is input (arrow PD 1) in the image process unit 18, and is temporarily stored (arrow PD 2) in the image memory 14 through the memory control unit 13 after receiving various types of image processes in the image process unit 18.

Moreover, in the output operation to the paper by the image writing unit 17, the image data stored in the image memory 14 is read by the memory control unit 13 and is input in the image process unit 18 (arrow PD 3), and is input in the image writing unit 17 (arrow PD 4), is emitted from the laser unit as a laser beam in the image writing unit 17, and is irradiated to the photoconductor drum which is driven so as to rotate after receiving various types of image processes in the image process unit 18. The surface of the photoconductor drum is equally charged in a predetermined polarity by the charger while being driven so as to rotate, and the toner is adhered to the electrostatic latent image by the developing device and the toner image is formed (developed) after the electrostatic latent image is formed on the surface of the photoconductor drum by the scanning exposure by the laser beam.

The toner image is transferred to the paper which is conveyed to the transferring position by the conveyance device from the photoconductor drum by the transfer-separation device. Further, the residual toner from the transferring on the photoconductor drum is removed by the cleaning device.

The paper in which the toner image is transferred is conveyed to the fixing device by the conveyance device, and the paper receives the fixing process of the toner image (image) by heating and pressuring when the paper is conveyed and is passed between the heating roller and the pressuring roller which are provided in the fixing device and the paper is output.

In the image forming apparatus 10, the image data PD is transmitted between the devices via the bus 25 in the flow of the above mentioned arrows PD 1 to PD 4 when the document image is read and when the document image is printed. Further, the CPU 11 operates the image forming function and the audio replay function by controlling the operation of each device according to the priority level of the table 30 shown in FIG. 2A when the apparatus is in the normal operation. Here, the image forming function is a collective term for a function to read the document image and to import the corresponding image data by the image reading unit 16, a function to form and to output the image which corresponds to the image data on the paper by the image writing unit 17 and a function to carry out various types of image processes to the image data by the image process unit 18.

Particularly, the CPU 11 executes the tasks which are needed for the printing operation such as the reading operation of an image by the image reading unit 16, the writing operation of the image by the image writing unit 17, the image process operation to process the image by the image process unit 18 and the like in top priority. The writing and reading of the image data is executed in the second priority. Thereafter, the CPU 11 receives the access to the HDD 15, the display by the operation unit 19 and the operation from a user, controls the communication and the data transmission between the external device via the network by the LAN control unit 21, controls the data transmission between the external device or the like by the USB control unit 20, and executes the audio replay by the audio codec IC 22 in the order of priority level. In such way, in the normal operation, the audio guidance which carries out the guidance of the operation condition and the operating method of the apparatus by the audio replay is executed when all the other functions are stopped.

Next, an operation when an abnormality occurs will be described. In the image forming apparatus 10 according to the embodiment, when an abnormality (abnormal operation) occurs or when an occurrence of an abnormality is predicted in advance, the announcement that an abnormality has occurred or that an abnormality occurs shortly and the content (symptom) of the abnormality is made to a user by an audio by replaying and outputting the guidance audio. For example, a breakdown of the apparatus, an operation error such as paper jam and the like, running out of consumable supplies such as papers in the paper feeding tray, toner which is filled in the image writing unit 17 and the like, filling up of the paper ejection tray, the finisher and the like with the printed papers are included in the content of the abnormality.

Figure 4:
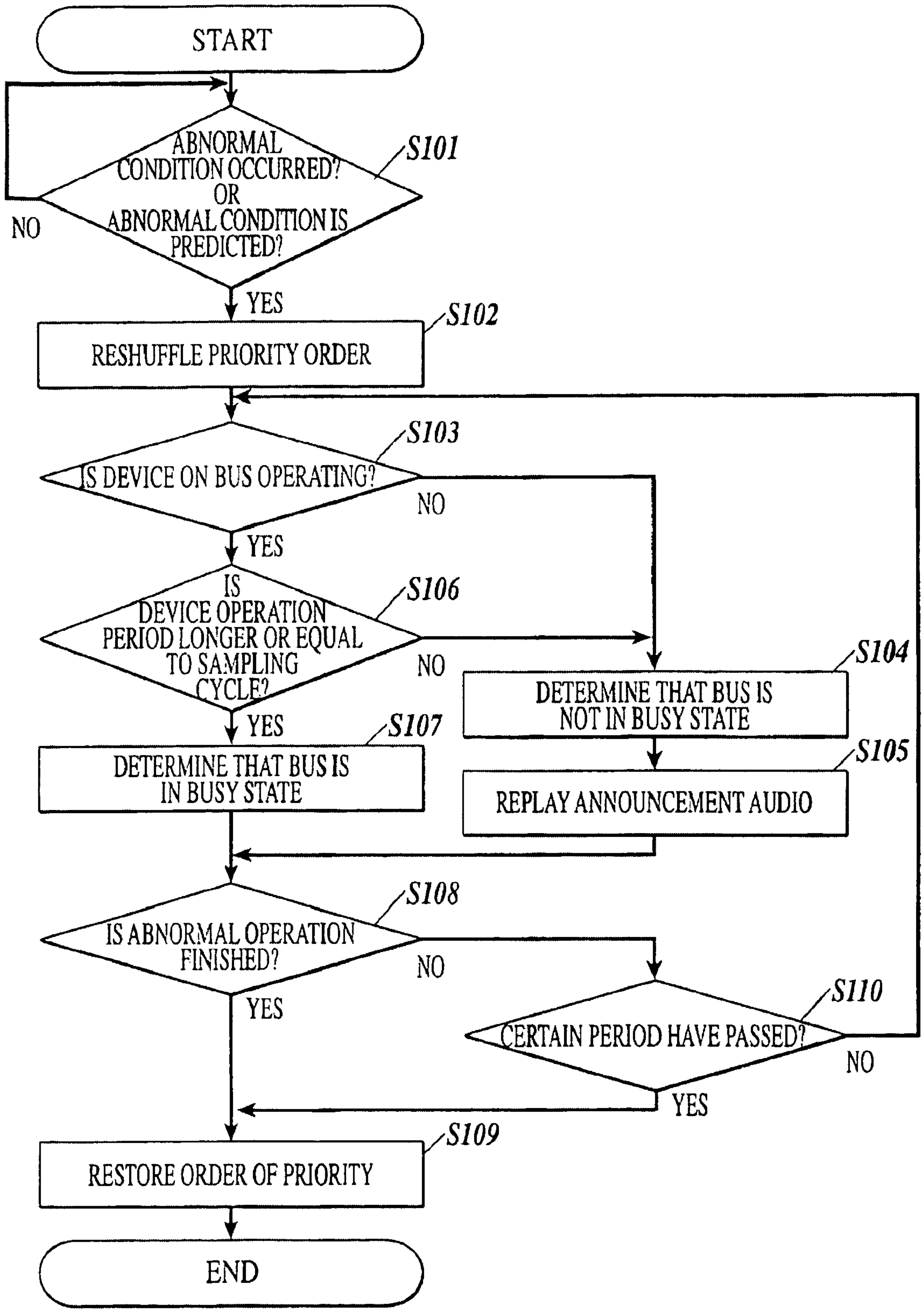
FIG. 4 is a flow chart showing a flow of an operation which carries out an audio announcement when an abnormality occurs in the image forming apparatus according to the embodiment of the present invention.

FIG. 4 shows a flow of the operation to make an announcement that the abnormality has occurred in the image forming apparatus 10 by an audio.

When the image forming apparatus 10 is activated (START), the CPU 11 monitors the condition of each unit of the apparatus and determines whether an abnormality has occurred or not or whether the occurrence of an abnormality is predicted in advance or not based on the detection information which is transmitted from the detection unit provided in each unit of the apparatus (step S101).

When an abnormality does not occur (normal condition) or when the occurrence of an abnormality cannot be predicted in advance (step S101; No), the CPU 11 continues to monitor the condition of each unit of the apparatus.

When an abnormally has occurred or when the occurrence of an abnormality is predicted in advance (step S101; Yes), the CPU 11 switches the priority level of the audio replay which is registered in the table 30 (step S102). That is, the CPU 11 changes the priority level of the "audio codec IC" (see FIG. 2A) which is registered at the lowest level of priority in the table 30 in the normal operation to the level next to the "image reading unit/image writing unit/image process unit" and the "memory control unit" (see FIG. 2B).

Subsequently, the CPU 11 determines whether the announcement can be carried cut normally by replaying the guidance audio without interruption or not, that is the CPU 11 determines whether the device connected to the bus 25 is operating or not in order to determine the busy state of the bus 25 which is the standard for determining whether the audio data stored in the work memory 12 can be transmitted to the audio codec IC 22 through the bus 25 in a predetermined sampling cycle or not (step S103).

When the device is not operating and the bus 25 is not being used due to a case where the apparatus is on standby or the like (step S103; No), the CPU 11 determines that the bus 25 is not in the busy state (step S104), and the CPU 11 operates each unit so as to replay and output the guidance audio (announcement audio) according to the priority levels of the table 30 (step S105) and the process proceeds to step S108.

Particularly, by the "image reading unit/image writing unit/image process unit" and the "memory control unit" which are registered at the higher level in priority than the "audio codec IC" in the table 30 not operating, the CPU 11 operates the audio replay by the "audio codec IC" which is at the next highest level in priority, and the CPU 11 transfers the audio data which corresponds to the detected abnormality and which is stored in the work memory 12 to the audio codec IC 22 in a predetermined sampling cycle. The audio codec IC 22 carries out the DA conversion to the audio data (digital audio signal) which is input from the digital I/F 23 via the bus 25 and outputs the data to the speaker 24 as the analog audio signal. In such way, the replay sound of the guidance audio which corresponds to the detected abnormality is output from the speaker 24.

On the other hand, when the apparatus is operating and when the device which is connected to the bus 25 is operating (step S103; Yes), the CPU 11 determines whether the operation period (using period of the bus 25) of the device is more or equal to the sampling cycle of the audio data or not (step S106).

When the apparatus is operating and when the operation period of the device is shorter than the sampling cycle of the audio data (step S106; No), the CPU 11 determines that the bus 25 is not in the busy state (step S104) and caries out the replay operation of the guidance audio (step S105), and the process proceeds to step S108. Particularly, the CPU 11 which can operate by each device operating by the command control transmits the audio data stored in the work memory 12 to the audio codec IC 22 in a predetermined sampling cycle and allows the audio codec IC 22 to carry out the audio replay.

Moreover, when the operation period of the device is more or equal to the sampling cycle of the audio data because a large amount of data is being transferred via the bus 25 in a case where the tasks relating to the printing operation is operating or the like (step S106; Yes), the CPU 11 determines that the bus 25 is in the busy state (step S107) and the process proceeds to step S108.

In step S108, the CPU 11 determines whether the abnormal operation is finished or not based on the detection information which is transmitted from the detection unit. When the CPU 11 determines that the abnormal operation is finished (step S108; Yes), the priority level of each device registered in the table 30 is returned to the priority level of the normal operation shown in FIG. 2A (step S109), and the process is finished (END).

When the CPU 11 determines that the abnormal operation is not finished (step S108; No), the CPU 11 determines whether a certain period of time has passed or not (step S110).

When the certain period of time has not passed (step S110; No), the process returns to the process of step S103. When the certain period of time has passed (step S110; Yes), the priority level of each device which is stored in the table 30 is returned to the priority level of the normal operation shown in FIG. 2A (step S109), and the process is finished (END).

Here, even when the audio replay is not carried out because the bus 25 is in the busy state, the audio replay is carried out when the busy state of the bus 25 finishes within the certain period of time. Further, when the audio replay is carried out through step S105, the CPU 11 stops the transferring of the audio data to the audio codec IC 22 and stops the replay of the guidance audio, and the process is finished. Furthermore, even when the process is finished through step S110 (when it is not recovered from the abnormality within the certain period of time), thereafter, the CPU 11 returns the priority level of each device in the table 30 to the priority level of the normal operation (see FIG. 2A) when it is recovered from abnormality and when the abnormal operation is finished.

By the above process, when the abnormal operation occurs in the image forming apparatus 10 or when the occurrence of the abnormal operation is predicted, the guidance audio is output right a way when the tasks needed for the printing operation and the like are not executed and when the bus 25 is not in the busy state. Therefore, a user can instantaneously know the occurrence of the abnormal operation and the detail of the content of the abnormality by listening to the guidance audio.

Moreover, even when the bus 25 is in the busy state at the time of occurrence of the abnormal operation or at the time of prediction of the occurrence of the abnormal operation, the guidance audio is output when the busy state of the bus 25 is finished within the certain period of time. Therefore, a user can know the occurrence of the abnormal operation and the detail of the content of the abnormality by listening to the guidance audio.

Hereinafter, a method to obtain the operation period of the device which is carried out to determine the busy state of the bus 25 will be described.

FIG. 5 shows an example of a table used to obtain the operation period of the device. As shown in FIG. 5, the length of the operation period in which the bus 25 is occupied by the device when the device is operating of each device which is connected to the bus 25 and the operation counter showing whether the device is operating or not is registered in the table 40.

For example, as a device connected to the bus 25, the device A, the device B, the device C, . . . are registered. As for the operation period, the device A is registered as 100 μs, the device B is registered as 200 μs, the device C is registered as 80 μs, . . . and the like. The operation periods are obtained in advance by calculating or by measuring.

Which device is used when each job is executed is predetermined according to the type of the job and the operation condition of the job. When an execution of a job is started, the CPU 11 sets the operation counter of the device which is used for the job to +1, and when the job execution is finished or when the job execution is interrupted, the CPU 11 sets the operation counter of the device which has been used for the job to −1.

By carrying out the above described process, which device is operating at this point or not is shown by the operation counter. When two jobs are executed simultaneously (for example, when facsimile is received during copy operation), the value of the operation counter of the device to be redundantly used for the jobs is 2.

When the CPU 11 determines whether the bus 25 is in the busy state or not, the CPU 11 obtains the sum of the operation period of the devices in which the value of the operation counter is 1 or more by referring the table 40. The sum shows the length of period (using period of the bus 25) in which the bus 25 may be continuously occupied by the device other than the CPU 11 at the time. For example, when the value of the operation counter of the device A and the device B is 1 or more, 100 μs+200 μs=300 μs is the using period of the bus 25.

When the obtained using period is more or equal to the sampling cycle of the audio data, the CPU 11 determines that the bus 25 is in the busy state. For example, when the audio data in which the sampling frequency is 8 kHz (sampling cycle is 125 μs) is attempted to be replayed, the CPU 11 obtains the using period at the time by referring to the table 40. When the using period is more or equal to 125 μs, the CPU 11 determines that the bus 25 is in the busy state, and when the using period is shorter than 125 μs, the CPU 11 determines that the bus 25 is not in the busy state. The using period can be obtained each time when whether the bus 25 is in the busy state or not is being determined. However, the using period can be calculated and stored when the value of the operation counter is changed, and this calculated using period can be referred to when determining the busy state.

Here, as for an example of the busy state of the bus 25, the busy state of the bus 25 easily occurs when the image data is transferred such as by facsimile, the scan, e-mail, the IP (Internet Protocol) and the like.

Next, the detail of the operation (step S101 in FIG. 4) of predicting the occurrence of the abnormal operation in advance in the above described announcement operation will be described by using a case of paper ran out as an example.

Figure 6:
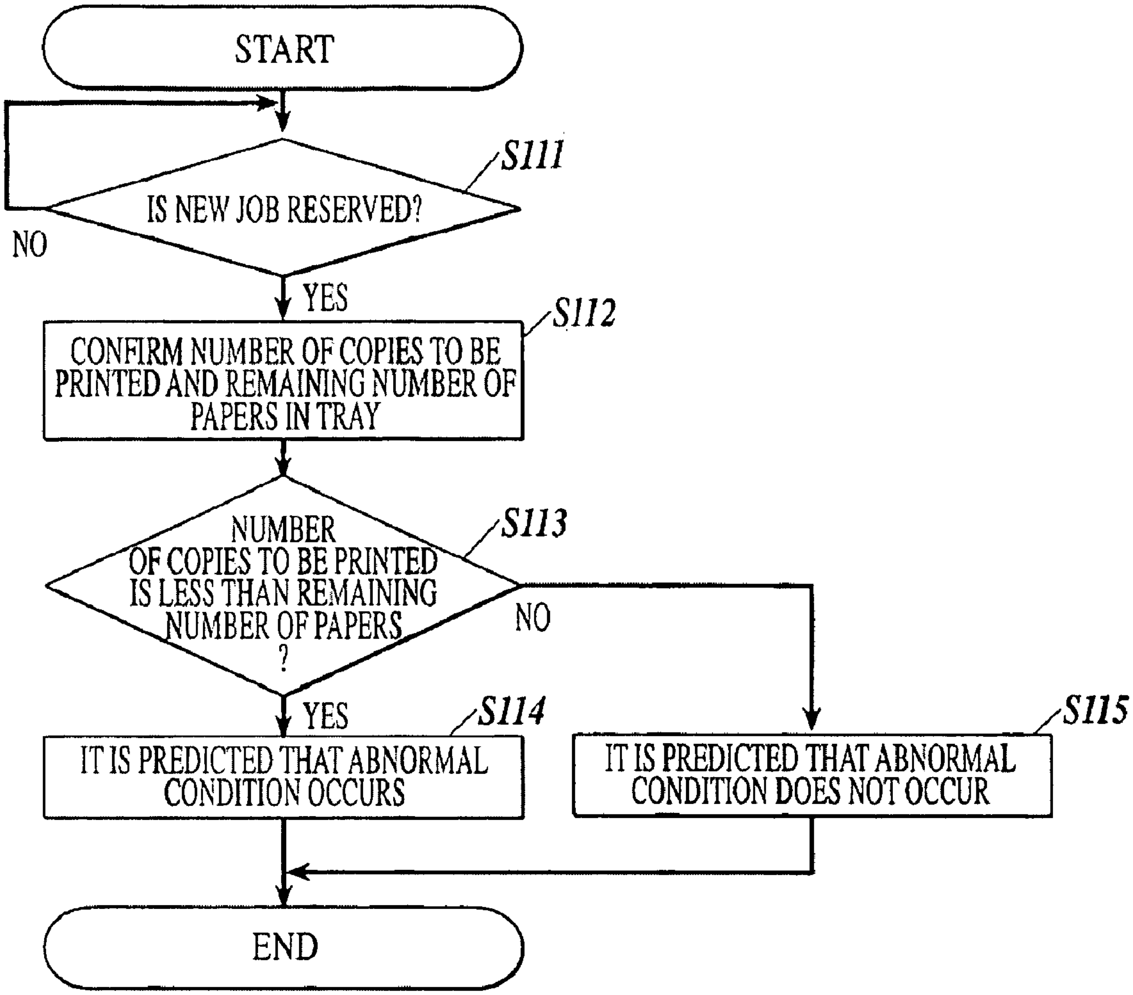
FIG. 6 is a flowchart showing a flow of an operation of predicting the occurrence of an abnormal operation in the image forming apparatus according to the embodiment of the present invention in advance.

FIG. 6 shows a flow of the operation to predict the occurrence of the abnormal operation (running out of paper) in advance. When the process is started (START), the CPU 11 determines whether a new job is reserved or not (step S111). When a new job is not reserved (step S111; No), the CPU 11 continues to monitor whether a new job is reserved or not.

When a new job is reserved (step S11; Yes), the CPU 11 confirms the number of copies to be printed in the job and confirms the remaining number of papers stored in the paper feeding tray based on the detection information which is transmitted from the remaining paper number detection unit provided at the paper feeding tray to detect the remaining number of papers (step S112).

After the confirmation, the CPU 11 determines whether the remaining number of papers is smaller than the number of copies to be printed in the job or not (step S113). When the remaining number of papers is smaller than the number of copies to be printed (step S113; Yes), the CPU 11 predicts that the abnormal operation due to the running out of paper occurs with the execution of the job (step S114), and the process is finished (END).

When the remaining number of papers is more or equal to the number of copies to be printed (step S113; No), the CPU 11 predicts that the abnormal operation due to the running out of paper does not occur even when the job is processed (step S115), and the process is finished (END).

As described above, in the image forming apparatus 10 of the embodiment, because the priority level of operating the audio replay function is controlled so as to be changed to be at a higher level in the abnormal operation than in the normal operation of the apparatus, the announcement of the abnormality by the audio replay can be carried out in higher priority in the abnormal operation comparing to the normal operation while preventing the performance reduction of the apparatus due to the audio replay in the normal operation.

Particularly, the other functions are not influenced by the operation of the audio replay which is set at the lowest level in the priority level in the normal operation and the audio replay can be carried out without reducing the performance of the entire apparatus including the image forming function. Further, by setting the priority level of the audio replay function at the level next to the priority level of the tasks needed for the printing operation such as the reading operation of the image, the writing operation of the image and the process operation to process the image in the abnormal operation, the audio replay is not carried out when the tasks needed for the printing operation is operating and the tasks will be executed without being influenced by the audio replay. Further, when the tasks needed for the printing operation is not operating in the abnormal operation, the audio replay is carried out by the audio replay function being prioritized over other functions. In such way, the announcement of the abnormality by the audio replay can be carried out in high priority without reducing the productivity in the abnormal operation.

Moreover, in the abnormal operation, the audio data can be transmitted for every sampling cycle through the bus 25 at the time of audio replay and the audio replay such that the audio is interrupted can be prevented by not carrying out the audio replay when the tasks needed for the printing operation which are at the higher priority level than the audio replay are operating and the bus 25 is in the busy state and by carrying out the audio replay when the busy state of the bus 25 is finished. Further, because the audio replay is carried out when the busy state of the bus 25 is finished even when the above tasks are operating, the audio replay without the sound being interrupted can be carried out instantaneously. In such way, a user can correctly understand the particular content of the abnormality of the apparatus by listening to the guidance audio without misunderstanding by the sound being interrupted and can promptly carry out an appropriate reaction according to the symptom.

Moreover, the abnormal operation of the image forming apparatus 10 includes the breakdown of the apparatus, the operation errors such as paper jam and the like, the running out of consumable supplies such as papers in the paper feeding tray, toner filled in the image writing unit 17 and the like, a condition where the paper ejection tray, the finisher and the like are filled with the printed paper and the like. When at least one of the above cases occurs, it is recognized that the abnormal operation has occurred and the announcement by the audio replay will be carried out. Therefore, a user can react promptly to such abnormal operations. In such way, reduction of productivity of the image forming due to the abnormal stoppage of the apparatus can be suppressed.

Moreover, the announcement by the audio replay is carried out by changing the priority level of the audio replay function to the same priority level as at the time when the abnormality occurs when it is predicted that the abnormal operation will occur in the image forming apparatus 10. Therefore, the announcement indicating that the abnormality will occur shortly can be made by setting the priority level to the higher level even when the apparatus is operating normal at the time. In such way, a user can instantaneously react before the abnormal operation actually occurs, and the operation stop time of the apparatus which is needed to react to the abnormal operation can be shortened and the reduction in the productivity can be further suppressed.

Moreover, when the abnormal operation occurs in the apparatus, the announcement by audio is carried out for a certain period of time as long as the reset operation or the like is not carried out. Therefore, the occurrence of the abnormal operation can be notified more surely through hearing even when a user is not near the apparatus. Further, even when the abnormality is not being reacted in such case where a user is not near the apparatus, an unnecessary announcement operation can be prevented because the announcement by audio is stopped when a certain period of time is passed. Furthermore, because the setting of the certain period of time in which the announcement by audio is being carried out can be changed by the operation unit 19, a user can arbitrarily change the setting by carrying out the announcement according to the using mode and the like of the image forming apparatus 10.

There are many cases where the copier which is developed for the POD (Print On Demand) market are used in the printing factory and the like, and there are many cases where a user cannot monitor the printing operation all the time by being near the apparatus. Therefore, when the abnormal operation such as the paper jam, the running out of paper in the paper feeding tray or the filling up of the finisher with paper occurs, there is a need to notify a user by hearing. However, there are many cases where the function of the copier continues to operate even when the abnormal operation occurs in such symptom, and there is a possibility that the audio is interrupted even when the guidance audio is attempted to be replayed by transmitting the audio data to the audio codec IC while the copier is operating.

On the other hand, in the image forming apparatus 10 according to the embodiment, the audio replay is carried out without reducing the performance of the apparatus in the normal operation and the audio replay is carried out without reducing the productivity in the abnormal operation to promptly make the announcement to a user by audio while preventing the audio replay such that the guidance audio is interrupted. Therefore, the present invention is particularly preferable when applied to the copier and the like which are developed for the POD market.

Moreover, whether the bus 25 is in the busy state or not is determined by the relationship between the using period of the bus 25 by the other device connected to the bus 25 and the sampling cycle of the audio data which is transmitted to the audio codec IC 22 via the bus 25.

That is, when the using period of the bus 25 by the other device connected to the bus 25 is longer or equal to the sampling cycle of the audio data which is transmitted to the audio codec IC 22 via the bus 25, it is determined that the bus 25 is in the busy state and the audio replay is not carried out. Further, when the using period of the bus 25 by the other device connected to the bus 25 is shorter than the sampling cycle of the audio data, it is determined that the bus 25 is not in the busy state and the audio replay is carried out via the bus 25. In such way, even when the bus 25 is used by other device connected to the bus 25 until the operation is stopped from the occurrence of the abnormality in the apparatus, the guidance audio can be replayed without the sound being interrupted when the open period is assured to the bus 25 within the sampling cycle of the audio data.

Moreover, by using the audio codec IC 22, the audio replay using the audio data which is transmitted via the bus 25 can be realized by using a simple structure.

As above, the embodiment of the present invention is described by the drawings. However, the specific structure is not limited to the present invention shown in the embodiment and changes and additions within the scope of the invention are to be included in the present invention.

For example, the method to determine whether the bus 25 is in the busy state or not is not limited to the example shown in the embodiment. In the table 40 exemplified in the embodiment, the operation period is registered for every device and the operation counter is provided. However, they can be structured to be provided individually by device and individually by operation condition. For example, the length of the occupation period of the bus 25 differs between in the case where the image data of A4 size document is being processed and in the case where the image data of A3 size document is being processed. Therefore, more accurate using period of the bus 25 can be obtained by setting the document size as the operation condition and by having the operation period and the operation counter for each document size provided for the same device, and by adding and subtracting the operation counter corresponding to the document size when the job is executed or when the job is finished/interrupted.

Moreover, in the embodiment, the value of the operation counter is added or subtracted when the job is executed or when the job is finished/interrupted. However, 1 may be added to the value of the operation counter corresponding to the device when the device is activated by the CPU 11 and 1 may be subtracted from the value of the operation counter corresponding to the device when the finishing of the operation cuts in from the device. In this method, the actual operation condition of the device is reflected to the table 40 and the determination of whether the bus 25 is in the busy state or not is more accurate. Other than this, an external circuit which measures the period of time in which the bus 25 is being used by the device other than the CPU 11 by monitoring the adjustment signal and the like of the bus 25 may be provided, and whether the bus 25 is in the busy state or not may be determined from the measurement result of the external circuit.

Moreover, the priority level to operate the audio replay function is not limited to the example shown in the embodiment. For example, in case of the table 30 described in the embodiment, the priority level of the audio replay function may be set at the higher level than the USB control unit and the LAN control unit in the normal operation of the apparatus and may be set at the lower level than the HDD in the abnormal operation. That is, the priority levels of the audio replay function is to be controlled so as to be changed within the range of the priority level which is at the lower level than the tasks according to the image forming function and to be at the higher level in the abnormal operation than in the normal operation.

Moreover, the audio data is stored in the work memory 12 connected to the CPU 11. However, the audio data may be stored in the other memory which is directly connected to the bus 25, the memory which is provided for the audio data or the like.

Moreover, regarding the prediction of the abnormal operation, the description is given for the case of the running out of paper (number of papers to be printed in the job>remaining number of papers). However, the prediction of the abnormal operation is possible for the case of the running out of toner. For example, the running out of toner can be predicted from the relationship between the toner consumption and the residual amount of the toner (toner consumption by the job>residual amount of toner).

Here, for example, the execution control based on the priority order of each unit shown in FIGS. 2A and 2B is realized by individually providing a task (program) to manage the operation for each unit, by setting the priority level for each task, and by switching the task in which the operating system is in the executable condition according to the priority level of the task. In this case, the changing process of the priority level which is shown in steps S102 and S109 of FIG. 4 is carried out by changing the priority level of the task according to the audio replay function.

According to a first aspect of the embodiment, an image forming apparatus comprising a plurality of functions including an image forming function and an audio replay function and a control unit to set a priority level to operate the audio replay function so that the priority level is higher in an abnormal operation of the apparatus than in a normal operation of the apparatus is provided.

In accordance with the first aspect of the embodiment, because the priority level to operate the audio replay function is set at a lower level in the normal operation than in the abnormal operation, the audio replay can be carried out without reducing the performance of the apparatus. Further, because the priority level to operate the audio replay function is set at a higher level in the abnormal operation than in the normal operation, a prompt announcement by the audio replay can be carried out.

Preferably, the control unit sets the priority level of the audio replay function to a lowest level in the normal operation.

Accordingly, in the normal operation, the other functions of the apparatus are not influenced by the audio replay function which is set at the lowest level in the priority level. Therefore, the performance of the entire apparatus including the image forming function will not be reduced by the audio replay.

Preferably, the control unit sets the priority level of the audio replay function to a highest level next to a priority level of the image forming function in the abnormal operation.

Accordingly, the audio replay is not carried out in the abnormal operation when the image forming function is operating, and the image forming operation is carried out without being influenced by the audio replay. Further, when the functions which are at the higher priority level than the image forming function are not operating in the abnormal operation, the audio replay is carried out by the audio replay function being prioritized over other functions. In such way, the announcement of the abnormality by the audio replay can be carried in the high priority without reducing the productivity of the image forming in the abnormal operation.

Preferably, the image forming function includes at least one of a reading operation of an image, a writing operation of the image and an image process operation to process the image.

Accordingly, the audio replay is not carried out while the operation according to the image forming function such as the reading operation of the image, the writing operation of the image and the image process operation are operating. Therefore, each operation according to the image forming function is executed without being influenced by the audio replay.

Preferably, a same bus is used to transfer an image data according to the image forming function and to transfer an audio data according to the audio replay function.

Accordingly, there is a case where the parallel operation of the image forming function and the audio replay function is disrupted by the image forming function and the audio replay function competing for the bus. Therefore, an adjustment is attempted to be carried out by the priority levels.

Preferably, when the bus is in a busy state by another function which is at a higher priority level than the audio replay function, the control unit operates the audio replay function after the busy state is finished.

Accordingly, the audio replay is not carried out when the bus is in the busy state by the image forming function which is at the higher priority level than the audio replay being operated and the audio data can be transmitted through the bus for every sampling cycle at the time of audio replay by carrying out the audio replay when the busy state of the bus is finished. Therefore, the audio replay such that the audio being interrupted can be prevented. Further, because the audio replay is carried out when the busy state of the bus is finished even when the image forming function is in the middle of operation, the audio replay such that the audio is not interrupted can be carried out instantaneously.

Preferably, the image forming apparatus further comprises an audio IC which converts the inputted audio data into an analog audio signal and outputs the analog signal to carry out the audio replay function and the audio data is input to the audio IC via the bus.

Accordingly, the audio IC converts the audio data which is input via the bus into the analog audio signal, and replays and outputs the audio which explains the operating explanation of the apparatus, the content of the abnormality and the like. By using such audio IC, the audio replay function which uses the audio data transmitted via the bus can be realized in a simple structure.

Preferably, the audio IC is connected to the bus.

Accordingly, the audio data is input to the audio IC through the bus which is connected to the audio IC.

Preferably, the control unit determines that the bus is in the busy state when a using period of the bus by another device connected to the bus is longer or equal to a sampling cycle of the audio data needed for an operation of the audio replay function.

Accordingly, the busy state of the bus is determined by the relationship between the using period of the bus by the other device on the bus and the sampling cycle (transmission cycle) of the audio data which is needed for the operation of the audio replay function. That is, when the using period of the other device which is connected to the bus is longer or equal to the sampling cycle of the audio data which is needed for the operation of the audio replay function, it is determined that the bus is in the busy state and the audio replay is executed after the busy state of the bus is finished. Further, when the using period of the bus by the other device which is connected to the bus is shorter than the sampling cycle of the audio data, it is determined that the bus is not in the busy state and the audio replay is executed right away.

In such way, even when the bus is used by other device connected to the bus until the operation is stopped from the occurrence of the abnormality in the apparatus, the guidance audio can be replayed without the sound being interrupted when the open period is assured to the bus within the sampling cycle of the audio data.

Preferably, the abnormal operation is at least one of a breakdown of the apparatus, an operation error of the apparatus and a running out of a consumable supply used for an image forming.

Accordingly, when at least one of the breakdown of the apparatus, the operation error of the apparatus and the running out of the consumable supply used for the image forming occurs, the announcement by the audio replay which indicates that the abnormal operation has occurred is carried out. Therefore, a user can promptly react to the abnormal operation. In such way, the reduction in productivity of the image forming due to the abnormal stoppage of the apparatus can be suppressed.

Preferably, the control unit predicts whether the abnormal operation occurs or not in advance, and sets the audio replay function at a same priority level as in the abnormal operation when the control unit predicts that the abnormal operation occurs.

Accordingly, when it is predicted that the abnormal operation will occur in the apparatus, the announcement by the audio replay is carried out by changing the priority level of the audio replay function to the same priority level as in the abnormality occurs. Therefore, the announcement which indicates that the abnormality will occur shortly can be made by setting the priority level at the higher level even when the apparatus is operating normally at the time. In such way, a use can instantaneously react before the abnormal operation actually occurs, and the reduction in the productivity of the image forming can be more suppressed because the operation stop time of the apparatus which is needed to react to the abnormal operation can be shortened.

Preferably, the audio replay function is carried out for a certain period of time when a predetermined finishing event does not occur.

Accordingly, when the abnormal operation occurs in the apparatus, the announcement by the audio replay is carried out for a certain period of time as long as a predetermined finishing event such as the recovery from the abnormal operation and the like does not occur. Therefore, the occurrence of the abnormal operation can be announced more surely through hearing even when a user is not near the apparatus. Further, even when the abnormal operation is not being reacted in such case where a user is not nearby the apparatus or the like, unnecessary announcement operation can be prevented because the announcement by the audio replay is stopped when a certain period of time is passed.

Preferably, the image forming apparatus further comprises a setting change unit to change a setting of the certain period of time.

Accordingly, because a certain period of time to carry out the announcement by the audio can be changed, a user can arbitrarily change the setting of the period of time to carry out the announcement according to the using mode and the like of the image forming apparatus.

The entire disclosure of Japanese Patent Application No. 2007-15189 filed on Jun. 7, 2007 is incorporated herein by reference in its entirety.

What is claimed is:

1. An image forming apparatus, comprising:

a plurality of units including an image forming unit, a memory control unit, an audio replay unit and other units; and a control unit for controlling operations of the image forming unit, the memory control unit, the audio replay unit, and the other units according to an order of priority levels wherein the control unit sets the priority level for operating the audio replay unit so that the priority level is a lowest among the plurality of units in the normal operation of the apparatus and changes the priority level for operating the audio replay unit so that the priority level is lower than the priority levels for operating the image forming unit and the memory control unit and higher than the priority level for operating the other units in an abnormal operation of the apparatus.

2. The image forming apparatus of claim 1, wherein the image forming unit includes at least one of an image reading unit which carries out a reading operation of an image, an image writing unit which carries out a writing operation of the image and an image process unit which carries out an image process operation to process the image.

3. The image forming apparatus of claim 1, wherein a same bus is used to transfer an image data according to the image forming unit and to transfer an audio data according to the audio replay unit.

4. The image forming apparatus of claim 3, wherein when the bus is in a busy state by an operation of another unit which is at a higher priority level than an operation of the audio replay unit, the control unit operates the audio replay unit after the busy state is finished.

5. The image forming apparatus of claim 4, wherein the control unit determines that the bus is in the busy state when a using period of the bus by another unit connected to the bus is longer or equal to a sampling cycle of the audio data needed for an operation of the audio replay unit.

6. The image forming apparatus of claim 3, further comprising an audio IC which converts the inputted audio data into an analog audio signal and outputs the analog audio signal to carry out an audio replay unit, wherein the audio data is input to the audio IC via the bus.

7. The image forming apparatus of claim 6, wherein the audio IC is connected to the bus.

8. The image forming apparatus of claim 1, wherein the abnormal operation is at least one of a breakdown of the apparatus, an operation error of the apparatus and a running out of a consumable supply used for an image forming.

9. The image forming apparatus of claim 1, wherein the control unit predicts whether the abnormal operation occurs or not in advance, and sets an operation of the audio replay unit at a same priority level as in the abnormal operation when the control unit predicts that the abnormal operation occurs.

10. The image forming apparatus of claim 1, wherein an operation of the audio replay unit is carried out for a certain period of time when a predetermined finishing event does not occur.

11. The image forming apparatus of claim 10, further comprising a setting change unit to change a setting of the certain period of time.

12. The image forming apparatus of claim 1, wherein the other units include at least one of a HDD, an operation unit, a LAN control unit, and a USB control unit.

13. An image forming apparatus which executes operations of a plurality of units in an order of a predetermined priority level, comprising:

a plurality of units including an image forming unit, a memory control unit, an audio replay unit and other units, the plurality of units being connected by a commonly used bus; and a control unit which determines whether the image forming apparatus is in an abnormal condition or not, and which sets the priority level for operating the audio replay unit so that the priority level is a lowest among the plurality of units when the image forming apparatus is determined to be in a normal condition and changes the priority level for operating the audio replay unit so that the priority level is lower than the priority levels for operating the image forming unit and the memory control unit and higher than the priority level for operating the other units when the image forming apparatus is determined to be in the abnormal condition which sets a priority level to operate the audio replay unit so as to be at a higher priority level than priority levels for operating other units in a normal operation of the apparatus when the apparatus is determined as being in the abnormal condition, and which sets the priority level to operate the audio replay unit so that the priority level is a lowest among the plurality of units in the normal operation of the apparatus.

14. The image forming apparatus of claim 13, wherein when the bus is in a busy state by an operation of another unit at a higher priority level than the operation of the audio replay unit, the control unit operates the audio replay unit after the busy state is finished.

15. A method for controlling an image forming apparatus in which a plurality of units including an image forming unit, a memory control unit, an audio replay unit and other units are connected to a commonly used bus, and executing each unit in an order of a predetermined priority level, the method comprising the steps of:

determining whether the image forming apparatus is in an abnormal condition;

setting a priority level for operating the audio replay unit so as to be a lowest among the plurality of units when the image forming apparatus is determined to be in a normal condition;

changing the priority level for operating the audio replay unit so as to be lower than the priority levels for operating the image forming unit and the memory control unit and higher than the priority level for operating the other units when the image forming apparatus is determined to be in the abnormal condition; and executing each unit according to the set priority level.

* * * * *